May 21, 1957 W. J. MIZEN 2,792,789
PUMP
Filed Jan. 17, 1955
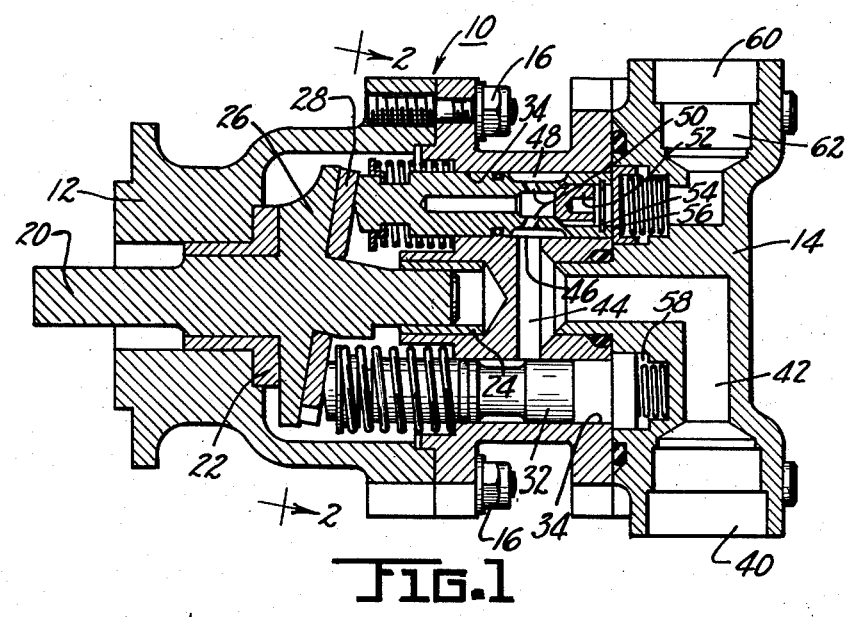
FIG.1
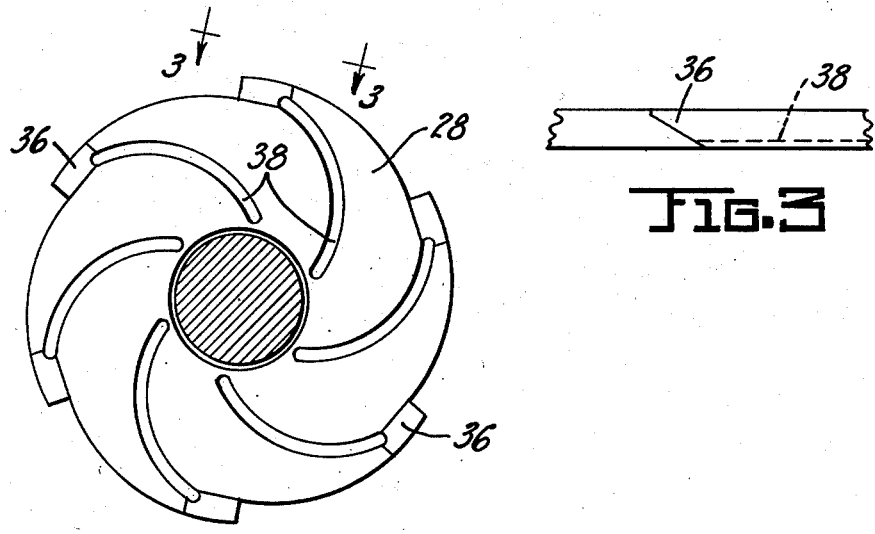
FIG.2
FIG.3
INVENTOR.
WALTER J. MIZEN
BY
James L. O'Brien
ATTORNEY ized Patent Office 2,792,789
Patented May 21, 1957

2,792,789
PUMP

Walter J. Mizen, Hamilton, Ohio, assignor to Bendix Aviation Corporation, South Bend, Ind., a corporation of Delaware Application January 17, 1955, Serial No. 482,060

2 Claims. (Cl. 103—173)

This invention relates generally to pumps of the reciprocating type and more particularly to a thrust member for such pumps.

It is an object of this invention to provide novel means for lubricating the area between a wobble plate and thrust member.

Other objects and advantages of the invention will become readily apparent from the following description taken in connection with the accompanying drawings, in which:

Figure 1 is a sectional view through a pumping device embodying my invention;

Figure 2 is a cross sectional view taken along line 2—2 of Figure 1; and

Figure 3 is a fragmentary view of Figure 2 looking in the direction of arrow 3—3.

In considering a specific embodiment of my invention the casing of a pump is half filled with lubricating oil. As the shaft is rotated, centrifugal force throws the oil against the walls of the casing where the entire volume of oil assumes a toroidal shape having a rotational speed substantially equal to shaft speed. The thrust bearing member is loosely mounted on the drive shaft and is held against rotation, or substantially so, by the reaction force of the plunger. The periphery of the thrust bearing member is provided with a plurality of scoops or fluid collecting means which project into the oil stream where impact causes the scoops to be filled with oil at a pressure dependent upon shaft speed. Each of the scoops is provided with a groove or canal for conducting the pressurized oil to the center of the bearing member.

Referring now to the drawings, numeral 10 designates a divided pump housing comprising end casings 12 and 14 clamped together by suitable bolts 16. A drive shaft 20 is rotatably supported in the housing by bearings 22 and 24. Formed integrally with shaft 20 is wobble plate 26 which is adapted to abut a thrust bearing member 28 rotatably mounted on shaft 20. The face of thrust bearing 28 is adapted to engage the conical end of pistons 32 which are slideably received in cylinders 34 located in casing 14.

The periphery of the thrust bearing is provided with a plurality of scoops 36 each having a taper leading from the face of the member to the inner wall where the scoop is connected to a curved passage or canal 38 in the inner wall having a terminus near the center of the member.

Casing 14 is provided with an inlet 40 connected by a passage 42 with a centrally located chamber 44 which is in communication with cylinders 34 through ports 46. Each of the pistons is formed with a groove 48 of sufficient width to remain in communication with port 46 during the entire stroke of the piston. The grooves 48 are connected to the hollow interior of the pistons 32 by passages 50. A floating check valve 52 is located in each of the pistons and is retained therein by a snap ring 54.

The outlet of each cylinder 34 is provided with a spring loaded check valve 56 which prevents reverse flow from the common discharge chamber 58. Outlet 60 formed in casing 14 is connected to chamber 58 by conduit 62.

In the operation of the pumping device the housing 10 is half filled with lubricating oil through a port (not shown) prior to operation of the pump. Fluid from a suitable source (not shown) is supplied to inlet 40 where it passes through passage 42, chamber 44, port 46, groove 48, passages 50 to the interior of the piston. On the intake stroke the check valve 52 is moved against the snap ring 54 and the fluid is permitted to fill the cylinder 34.

On the discharge stroke the check valve 52 is seated in the interior of the piston and fluid is forced out of the cylinder past check valve 56 through chamber 58, conduit 62 to the outlet 60.

When the shaft is rotated the lubricating oil in the housing 10 will be hurled against the inside wall of the housing where it assumes a torcidal form having a rotational speed substantially equal to the speed of the shaft. The thrust bearing 28 is held against rotation by the force of pistons 32 acting against the face thereof. The peripheral scoops of the bearing are located to project into the toroidal stream of lubricating oil and by impact are filled with oil under pressure. Canals 38 in the inner side of bearing 28 conduct the fluid toward the center of the bearing to induce a fluid film between wobble plate and thrust bearing whereby the operation of the pump under load is permitted.

While only one embodiment of the invention has been shown and described in detail it will be understood that this is illustrative only and is not to be taken as a definition of the scope of the invention, reference being had for this purpose to the appended claims.

I claim:

1. In a pump having a housing, a drive shaft, a wobble plate and a plurality of plungers: a thrust member formed with a central aperture, said member being rotatably mounted on said shaft between said plate and plungers for engagement with said plate and plungers; a plurality of scoops formed on the periphery of said member, said scoops being tapered from the plate engaging side of said member to the plunger engaging side of said member; and passages formed in the plate engaging side of said member extending from each of said scoops to a terminus spaced from said aperture.

2. A shaft with a flange thereon, a thrust member mounted for rotation on said shaft and in abutting relation with said flange, said thrust member comprising a plurality of circumferential projections formed on the peripheral edge of said member to provide fluid scoops, means defining an opening in said member, and passages formed in the plate engaging side of said member extending from each of said scoops to termini spaced from said means.

References Cited in the file of this patent

UNITED STATES PATENTS

| 1,415,690 | Parret | May 9, 1922 |
| 1,568,780 | Sparks | Jan. 5, 1926 |
| 2,461,279 | Huber | Apr. 1, 1946 |